United States Patent
Rathi et al.

(10) Patent No.: US 8,234,572 B2
(45) Date of Patent: Jul. 31, 2012

(54) REMOTE ACCESS TO ADVANCED PLAYLIST FEATURES OF A MEDIA PLAYER

(75) Inventors: Shailesh Rathi, Sunnyvale, CA (US); Lawrence G. Bolton, Fremont, CA (US)

(73) Assignee: Apple Inc., Cupertino, CA (US)

( * ) Notice: Subject to any disclaimer, the term of this patent is extended or adjusted under 35 U.S.C. 154(b) by 523 days.

(21) Appl. No.: 12/401,090

(22) Filed: Mar. 10, 2009

(65) Prior Publication Data

US 2010/0235739 A1    Sep. 16, 2010

(51) Int. Cl.
*G06F 3/00* (2006.01)
(52) U.S. Cl. .................... 715/716; 345/418; 345/475
(58) Field of Classification Search .......... 345/418–475, 345/521; 715/716
See application file for complete search history.

(56) References Cited

U.S. PATENT DOCUMENTS

| | | | |
|---|---|---|---|
| 5,964,847 A | 10/1999 | Booth, III et al. | |
| 6,611,813 B1 * | 8/2003 | Bratton | 705/26.1 |
| 7,293,122 B1 | 11/2007 | Schubert et al. | |
| 7,441,058 B1 | 10/2008 | Bolton et al. | |
| 7,441,192 B2 * | 10/2008 | Pisz | 715/727 |
| 7,526,588 B1 | 4/2009 | Schubert et al. | |
| 7,529,870 B1 | 5/2009 | Schubert et al. | |
| 7,529,871 B1 | 5/2009 | Schubert et al. | |
| 7,529,872 B1 | 5/2009 | Schubert et al. | |
| 7,533,091 B2 * | 5/2009 | Plastina et al. | 705/26.1 |
| 7,571,183 B2 * | 8/2009 | Renshaw et al. | 1/1 |
| 7,680,824 B2 * | 3/2010 | Plastina et al. | 707/737 |
| 7,985,911 B2 * | 7/2011 | Oppenheimer | 84/600 |
| 2003/0073432 A1 | 4/2003 | Meade, II | |
| 2003/0110057 A1 * | 6/2003 | Pisz | 705/1 |
| 2003/0135513 A1 * | 7/2003 | Quinn et al. | 707/102 |
| 2006/0107823 A1 * | 5/2006 | Platt et al. | 84/616 |
| 2006/0112098 A1 * | 5/2006 | Renshaw et al. | 707/7 |
| 2006/0224962 A1 * | 10/2006 | Ostojic et al. | 715/716 |
| 2007/0061759 A1 * | 3/2007 | Klein | 715/853 |
| 2007/0122002 A1 * | 5/2007 | Crabtree | 382/103 |
| 2007/0214182 A1 * | 9/2007 | Rosenberg | 707/104.1 |
| 2008/0263476 A1 * | 10/2008 | Vignoli et al. | 715/810 |
| 2008/0301317 A1 * | 12/2008 | Lee et al. | 709/231 |

(Continued)

FOREIGN PATENT DOCUMENTS

WO    WO 2007101218 A2 *    9/2007

OTHER PUBLICATIONS

"MPV™ Music Profile Specification", document available at http://osta.org/mpv/public/specs/MPVMusic-Prof-Spec-1.00.pdf, Jan. 7, 2004, Rev. 1.00, OSTA.ORG, Optical Storage Technology Association, Printed Jun. 1, 2009, pp. 1-70.

(Continued)

*Primary Examiner* — Ryan Pitaro
(74) *Attorney, Agent, or Firm* — Kilpatrick Townsend & Stockton LLP

(57) ABSTRACT

A media player can have advanced-playlist creation capabilities such as the ability to automatically generate a playlist around a "seed" song selected by a user. In some embodiments, the accessory can determine whether the media player can use a particular song as a seed song for an advanced playlist and can so inform the user. The user can then operate the accessory's user interface to create an advanced playlist based on a particular song, rather than having to interact directly with the media player.

23 Claims, 5 Drawing Sheets

U.S. PATENT DOCUMENTS

| | | | |
|---|---|---|---|
| 2009/0060225 A1* | 3/2009 | Lydon et al. | 381/105 |
| 2009/0063975 A1 | 3/2009 | Bull et al. | |
| 2009/0077052 A1* | 3/2009 | Farrelly | 707/5 |
| 2010/0070917 A1* | 3/2010 | Gates et al. | 715/810 |
| 2010/0088602 A1* | 4/2010 | Morris | 715/716 |
| 2010/0095332 A1* | 4/2010 | Gran et al. | 725/93 |
| 2010/0162115 A1* | 6/2010 | Ringewald et al. | 715/716 |
| 2010/0211968 A1* | 8/2010 | Itskov et al. | 725/25 |
| 2011/0060991 A1* | 3/2011 | Grant et al. | 715/718 |
| 2011/0066943 A1* | 3/2011 | Brillon et al. | 715/716 |

OTHER PUBLICATIONS

"Understanding Genius for iPod and iPhone", at URL http://support.apple.com/kb/HT2978 Last Modified: Sep. 17, 2008, Article: HT2978, Printed Jun. 1, 2009, 1 page.

\* cited by examiner

| COMMAND | PAYLOAD |
|---|---|
| GetPlaylistInfo | Playlist ID |
| RetPlaylistInfo | Information about specified Playlist |
| IsAdvancedPlaylistAvailableForTrack | Status of Media Asset |
| CreateAdvancedPlaylist | Criteria for creating Advanced Playlist |
| RefreshAvancedPlaylist | Playlist Index |
| SaveAdvancedPlaylist | None |

REMOTE ACCESS TO ADVANCED PLAYLIST FEATURES OF A MEDIA PLAYER

BACKGROUND

The present disclosure relates generally to media players and in particular to providing remote access to advanced playlist features of a media player.

A portable media device (PMD) can store media assets, such as audio tracks, video tracks or photos that can be played or displayed on the portable media device. Examples of portable media devices are the iPod® and the iPhone™ portable media devices, which are available from Apple Inc. of Cupertino, Calif.

A portable media device can include one or more connectors or ports that can be used to interface with other devices. For example, the connector or port can enable the portable media device to couple to a host computer, be inserted into a docking system, or receive an accessory device. In the case of the iPod®, e.g., a vast array of accessory devices have been developed that can interconnect to the portable media device.

Portable media devices commonly connect with accessories for playback or presentation of tracks stored on the portable media device. A user can dock a portable media device to a home stereo system, for example, and play back songs stored on the portable media device but with sound experience provided by the home stereo system.

In some instances, an accessory can be used to control operation of a portable media device. The accessory can send commands to the portable media device indicating a user-requested operation (such as starting or pausing playback, skipping to the next track, returning to a previous track, fast-forward or rewind within a track, etc.). The portable media device can execute the requested operation, thus allowing the user to operate the portable media device without touching the portable media device. Such remote control operation can be particularly useful in situations where it is inconvenient for a user to manipulate the portable media device's interface directly. For example, portable media devices tend to be small, with relatively small controls and display screens. Thus, it can be difficult for a user to operate such a device while driving or from across a room. Some accessories provide a graphical user interface (GUI) and allow the user to perform more advanced functions such as browsing a database of stored content, selecting content to play, etc.

SUMMARY

Certain embodiments of the present invention relate to increasing a user's ability to control a media player using an accessory device. For example, the media player can have advanced-playlist creation capabilities such as the ability to automatically generate a playlist around a "seed" song selected by a user. In some embodiments, the accessory can determine whether the media player can use a particular song as a seed song for an advanced playlist and can so inform the user. The user can then operate the accessory's user interface to create an advanced playlist based on a particular song, rather than having to interact directly with the media player.

In one embodiment, an accessory can acquire a list of current tracks that are queued to be played from a portable media device. In addition, the accessory can also request information from the portable media device to determine whether a particular track (which might or might not be a currently queued track) has the capability of being used to create an advanced playlist. The accessory can present this information to the user and prompt the user to make a selection. The accessory can notify the portable media device to create an advanced playlist based on user input. In addition, the accessory can have the capability to instruct the portable media device to save and/or refresh the newly created advanced playlist or other advanced playlists.

In another embodiment, a portable media device can provide an accessory with advanced playlist capability information (e.g., for tracks queued to be played) and wait for the accessory to communicate a user selection. If the portable media device receives an instruction from the accessory to create an advanced playlist based on specified track (e.g., a track selected by a user operating the accessory), the portable media device can attempt to create an advanced playlist for the selected track. The portable media device can communicate successful creation of the advanced playlist to the accessory (or it can communicate an error if for some reason the advanced playlist cannot be created).

The following detailed description, together with the accompanying drawings will provide a better understanding of the nature and advantages of the present invention.

DETAILED DESCRIPTION OF THE EMBODIMENTS

Certain embodiments of the present invention relate to increasing a user's ability to control a media player using an accessory device. For example, the media player can have advanced-playlist creation capabilities such as the ability to automatically generate a playlist around a "seed" song selected by a user. In some embodiments, the accessory can determine whether the media player can use a particular song as a seed song for an advanced playlist and can so inform the user. The user can then operate the accessory's user interface to create an advanced playlist based on a particular song, rather than having to interact directly with the media player.

Figure 1:
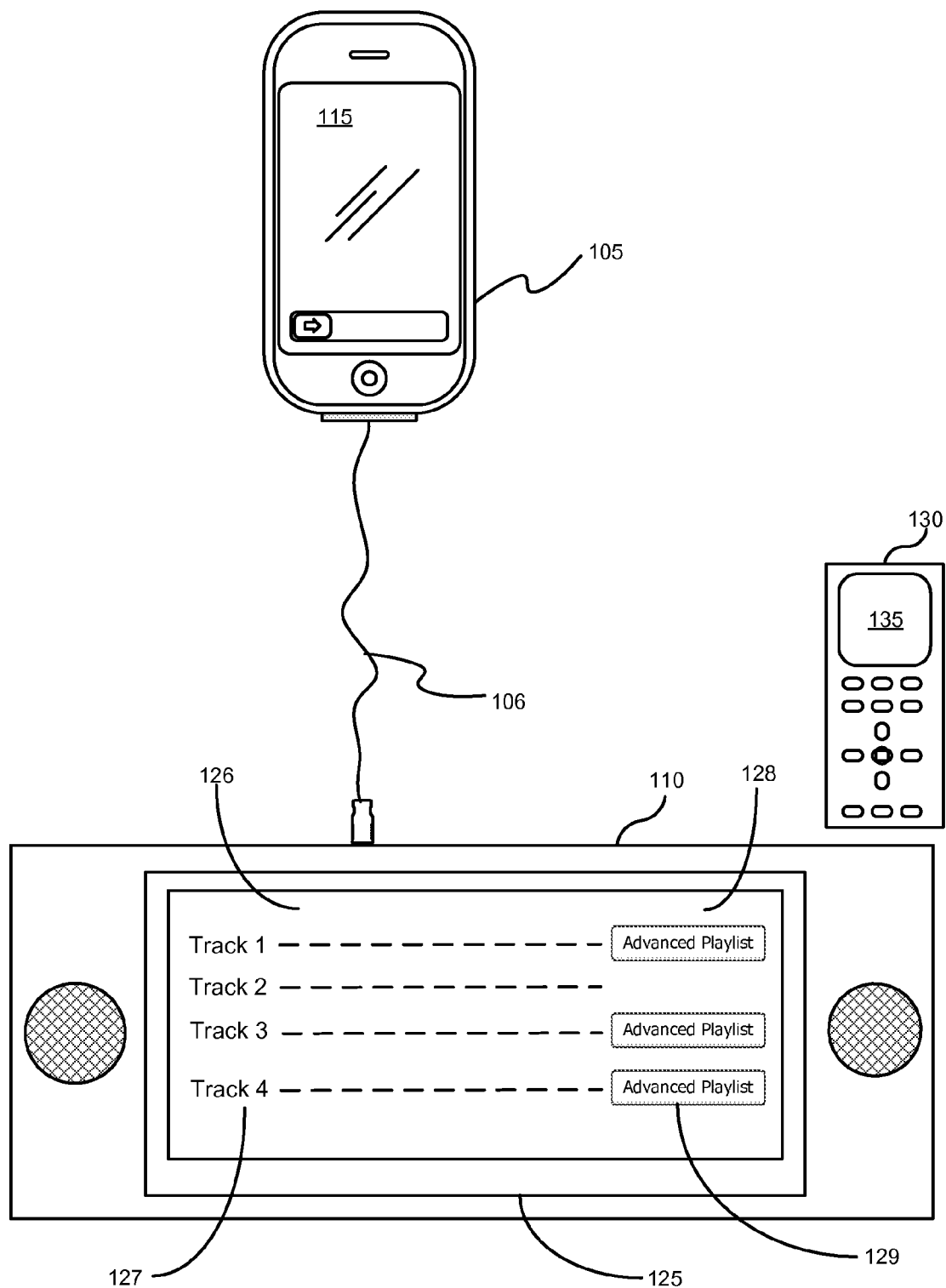
FIG. 1 illustrates a functional diagram of a portable media device docked to an accessory according to another embodiment of the present invention.

FIG. 1 illustrates portable media device (PMD) 105. PMD 105 can be docked to accessory 110, e.g., a home entertainment system or an in-vehicle media unit, in an embodiment of the present invention. The docking of PMD 105 to accessory 110 can be achieved in various ways, e.g., direct connection between mating connectors of PMD 105 and accessory 110 (not shown), indirect connection using cable 106 as shown, wireless connection, physical placement of PMD 105 in a opening in accessory 110, or the like. Accessory 110 can include remote user interface device 130. A playlist (or other listing of media assets) can be viewable in PMD display 115.

Subsequent to docking, the same playlist can be viewable on accessory display 125 or on remote user interface device display 135. In one embodiment, accessory display 125 can include information display section 126. Information display section 126 can display information 127 related to media assets, in addition to other information. Information display section 126 can also include selection section 128. Selection section 128 can include user operable devices 129, e.g., buttons, icons, etc. Accessory 110 can include an internal controller device to manage various functions of the accessory including communications with remote user interface device 130 and PMD 105.

PMD 105 can have multiple media assets stored on an internal storage device (not shown). In addition, PMD 105 can have the ability to create a custom playlist based on user input. Such a custom playlist can be referred to as an advanced playlist. In some embodiments, an advanced playlist can be created based on a media asset stored in the portable media device. The user can operate the interface of PMD 105 to select a "seed" song, and PMD 105 can identify one or more other songs stored on its internal storage device that have some analogous information to the seed song, e.g., artist, genre, year of recording, etc. "Analogous" can be determined in various ways, including explicit user preferences and settings, analysis of behavior patterns of the user or aggregate behavior of large numbers of users (e.g., which artists tend to appear together on a user's manually-created playlists). Specific examples of techniques usable to create an advanced playlist are described in commonly-assigned co-pending U.S. patent application Ser. No. 12/145,235, filed Jun. 24, 2008.

In some embodiments, the accessory can instruct the portable media device to create an advanced playlist without having the user interact directly with the portable media device to do so. In this way, the user can continue to have access to the media assets and advanced playlist generation capabilities on the portable media device, yet be able to control the playback of the media assets according to his liking, from the accessory. Thus, the user can have the benefit of creating advanced playlists remotely thereby enhancing his playback experience.

In order for the accessory to instruct the portable media device to create an advanced playlist, an interface for managing the transfer of information between the portable media device and the accessory can be provided. A collection of remote user interface commands can be used in the interface such that the user can use the accessory to instruct the portable media device to create an advanced playlist based on user input to the accessory without the user having to directly access the portable media device. The accessory can provide the user with a display of the advanced playlist along with the media assets included in that particular advanced playlist.

Figure 2:
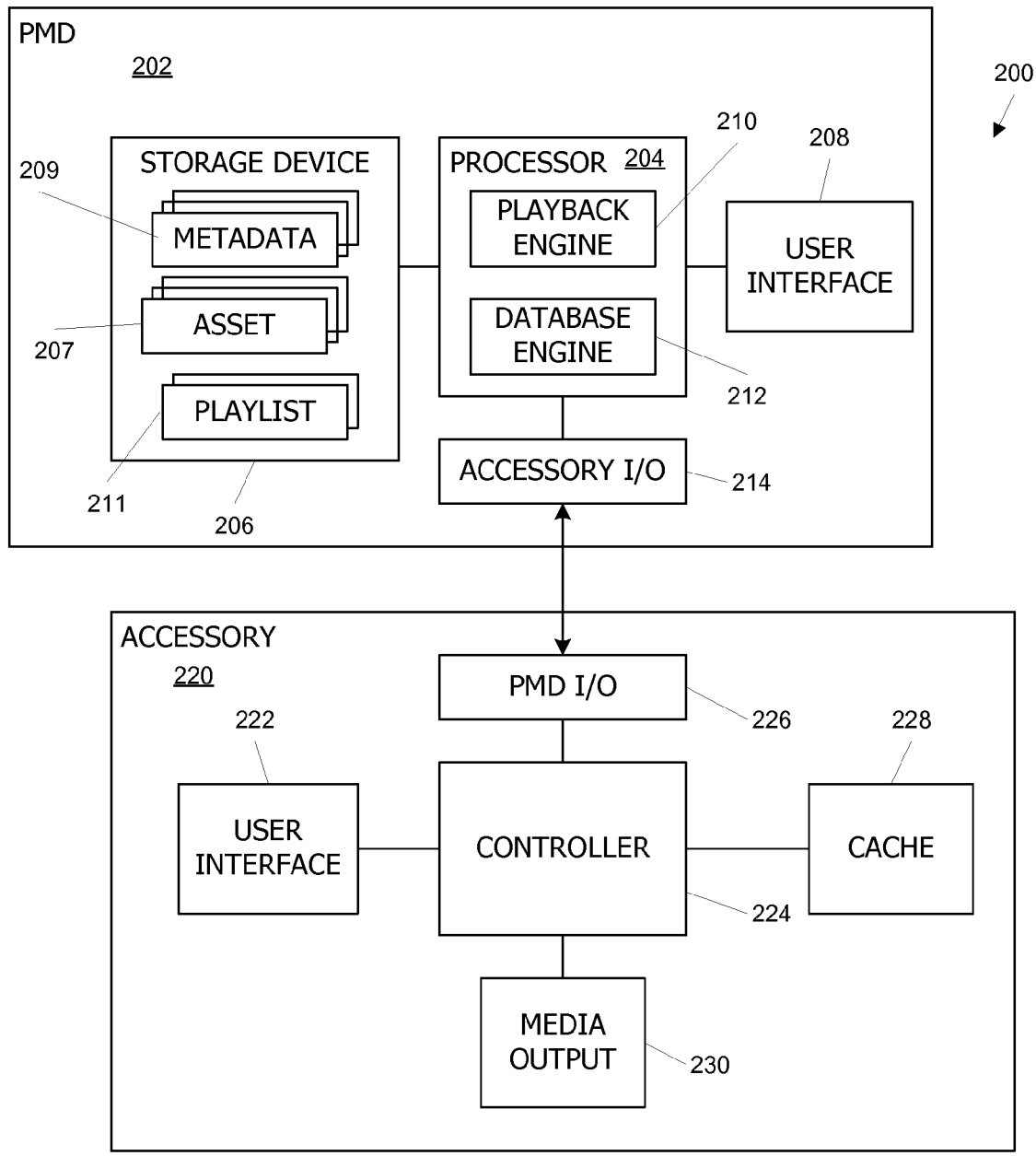
FIG. 2 is a block diagram of a system including a portable media device and an accessory according to an embodiment of the present invention.

FIG. 2 is a block diagram of system 200 according to an embodiment of the present invention. System 200 can include PMD 202 (e.g., implementing PMD 105 of FIG. 1) and an accessory 220 (e.g., implementing accessory 110 of FIG. 1).

PMD 202 in this embodiment can provide media player capability. PMD 202 can include processor 204, storage device 206, user interface 208, and accessory input/output (I/O) interface 214. Processor 204 in this embodiment can implement playback engine 210 and database engine 212, e.g., as software programs executed by processor 204. PMD 202 can execute programs that generate advanced playlists and can get metadata useful for advanced playlists from a host.

Storage device 206 can be implemented, e.g., using disk, flash memory, or any other non-volatile storage medium. In some embodiments, storage device 206 can store media assets 207 (also referred to herein as "tracks"), such as audio, video, still images, or the like, that can be played by host device 202. Storage device 206 can implement a database that stores media assets 207 and also stores metadata records 209 associated with each media asset 207. The metadata record 209 for a given asset can include various fields, e.g., a media type (audio track, video track, audio book, still image, etc.); an asset title; a name of an artist or performer associated with the asset; composer or author information; asset length; chapter information; album information; lyrics; information about associated artwork or images; description of the asset; and so on. The database can also include "playlists" 211, which are lists of assets that can be played sequentially by playback engine 210. Playlists can include user-created playlists and/or automatically generated playlists. (It is to be understood that playback engine 210 can also have the capability to "shuffle" a playlist 211 and play the tracks of the playlist in a random order; user interface 208 can be used to turn shuffle on or off).

Storage device 206 can also store other information such as information about a user's contacts (names, addresses, phone numbers, etc.); scheduled appointments and events; notes; and/or other personal information. In still other embodiments, storage device 206 can store one or more programs to be executed by processor 204 (e.g., video game programs, personal information management programs, programs implementing playback engine 210 and/or database engine 212, etc.).

User interface 208 can include input controls such as a touch pad, touch screen, scroll wheel, click wheel, dial, button, keypad, microphone, or the like, as well as output devices such as video screen, indicator lights, speakers, headphone jacks or the like, together with supporting electronics (e.g., digital-to-analog or analog-to-digital converters, signal processors or the like). A user can operate the various input controls of user interface 208 to invoke the functionality of PMD 202 and can view and/or hear output from PMD 202 via user interface 208.

Processor 204, which can be implemented as one or more integrated circuits (e.g., a conventional microprocessor or microcontroller), can control the operation of PMD 202. For example, in response to user input signals provided by user interface 208, processor 204 can operate database engine 212 to navigate a database of assets 207 stored in storage device 206 in response to user input and can display lists of selected assets 207 using some or all of the associated metadata 209 to identify each selected asset 207. Processor 204 can respond to user selection of an asset 207 by transferring asset information to playback engine 210. Playback engine 210 can play an asset 207 or a playlist 211 of assets; assets to be played can be selected by the user interacting with database engine 212. In some embodiments, playback engine 210 can also store and play a temporary playlist (e.g., an "on the go" playlist as supported in certain iPod® media players) created by the user interacting with user interface 208.

Accessory I/O interface 214 can allow PMD 202 to communicate with various accessories. For example, accessory I/O interface 214 might support connections to an external speaker dock, a radio (e.g., FM, AM and/or satellite) tuner, an in-vehicle entertainment system, an external video device, or the like. In one embodiment, accessory I/O interface 214 includes a 30-pin connector corresponding to the connector used on iPod® products manufactured and sold by Apple Inc. Alternatively or additionally, accessory I/O interface 214 can include a different connector and/or wireless interface (e.g., Bluetooth or the like).

In some embodiments, PMD 202 can also use accessory I/O interface 214 to communicate with a host computer (not explicitly shown) that executes a media asset management program (such as the iTunes® media asset management program distributed by Apple Inc.). The media asset management program can enable a user to add media assets 207 to PMD 202 and/or remove media assets from PMD 202. The user can also update metadata 209 associated with media assets 207 on PMD 202. In some embodiments, the user can also interact with the media asset management program to create and update playlists 211. In one embodiment, the host computer maintains a master database of media assets (including associated metadata and playlists), and the media asset management program synchronizes the master database with the database maintained on storage device 206 of PMD 202 automatically whenever PMD 202 connects to the host computer.

Accessory 220 includes controller 224, user interface 222, PMD I/O interface 226, cache 228, and media output device 230. Controller 224 can include, e.g., a microprocessor or microcontroller executing program code to perform various functions such as digital audio decoding, analog or digital audio and/or video processing, and the like. User interface 222 can include input controls such as a touch pad, touch screen, scroll wheel, click wheel, dial, button, keypad, microphone, or the like, as well as output devices such as video screen, indicator lights, speakers, headphone jacks or the like, together with supporting electronics (e.g., digital-to-analog or analog-to-digital converters, signal processors or the like). Alternatively, output components of user interface 222 can be integrated with media output device 230. A user can operate the various input controls of user interface 222 to invoke the functionality of accessory 220 and can view and/or hear output from accessory 220 via user interface 222. In addition, a user can operate PMD 202 via user interface 222. In some embodiments, user interface 222 can be located remote to the accessory. For instance, user interface 222 can be implemented in a remote control device (not shown) that is communicably coupled to accessory 220 and that can be used to control the various functions performed by accessory 220.

PMD I/O interface 226 can allow accessory 220 to communicate with PMD 202 (or another PMD). Examples are described below.

Cache 228, which can be implemented using volatile and/or nonvolatile memory, provides storage for various information including information obtained from PMD 202. For example, in some embodiments, accessory 220 can obtain some or all of metadata 209 and/or playlists 211 from PMD 202. Any or all of this information can be stored in cache 228. Caching of information obtained from PMD 202 by accessory 220 is optional; where used, caching can help speed up performance of accessory 220 by avoiding repeated requests for information from PMD 202.

Media output device 230, which can be implemented, e.g., as one or more integrated circuits, provides the capability to output various types of media. For example, media output device 230 can include a display screen or a driver circuit and connector for an external display screen, thereby enabling video and/or still images to be presented to a user. Additionally or instead, media output device 230 can also include one or more speakers or driver circuits and connectors for external speakers, thereby enabling audio to be presented to a user. In one embodiment, controller 224 can receive media content signals from PMD 202 via PMD I/O interface 226 and can provide the signals with or without further processing to media output device 230; media output device 230 can transform the signals as appropriate for presentation to the user.

Accessory 220 can be any accessory that provides a user interface suitable to navigating a database. Examples of accessories implementing accessory 220 include, e.g., an external speaker dock, a radio (e.g., FM, AM and/or satellite) tuner, an in-vehicle entertainment system, an external video device, or the like. In one embodiment, PMD I/O interface 226 includes a 30-pin connector that mates with the connector used on iPod® and iPhone™ products manufactured and sold by Apple Inc. PMD I/O interface 226 can also include other types of connectors, e.g., Universal Serial Bus (USB) or FireWire connectors, and/or a wireless interface (e.g., Bluetooth or the like).

It will be appreciated that the system configurations and components described herein are illustrative and that variations and modifications are possible. The PMD and/or accessory can have other capabilities not specifically described herein.

Further, while the PMD and accessory are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of devices including electronic devices implemented using any combination of circuitry and software.

Accessory I/O interface 214 of PMD 202 and PMD I/O interface 226 of accessory 220 allow PMD 202 to be connected to accessory 220 and subsequently disconnected from accessory 220. As used herein, PMD 202 and accessory 220 are "connected" whenever a communication channel between accessory I/O interface 214 and PMD I/O interface 226 is open and are "disconnected" whenever the communication channel is closed. Connection can be achieved by physical attachment (e.g., between respective mating connectors of PMD 202 and accessory 220), by an indirect connection such as a cable, or by establishing a wireless communication channel. Similarly, disconnection can be achieved by physical detachment, disconnecting a cable, powering down accessory 220 or PMD 202, or closing the wireless communication channel. Thus, a variety of communication channels can be used, including wired channels such as USB, FireWire, or universal asynchronous receiver/transmitter ("UART"), or wireless channels such as Bluetooth. In some embodiments, multiple communication channels between a media player and an accessory can be open concurrently, or a media player can be connected to multiple accessories, with each accessory using a different communication channel.

Regardless of the particular communication channel, as long as PMD 202 and accessory 220 are connected to each other, the devices can communicate by exchanging commands and data according to a protocol. The protocol defines a format for sending messages between PMD 202 and accessory 220. For instance, the protocol can specify that each message is sent in a packet with a header and an optional payload. The header provides basic information (e.g., a start indicator, length of the packet, and a command to be processed by the recipient), while the payload provides any data associated with the command; the amount of associated data can be different for different commands, and some commands can provide for variable-length payloads. In various embodiments, the protocol can define specific commands to indicate an action to be taken by the recipient; to signal completion of a task, change of state, or occurrence of an error; and/or to identify the nature of the associated data. In some embodiments, the commands can be defined such that a particular command is valid in only one direction. The packet can also include error-detection or error-correction codes as known in the art.

The protocol can define a number of "lingoes," where a "lingo" is a group of related commands that can be supported (or unsupported) by various classes of accessories. In one embodiment, a command can be uniquely identified by a first byte identifying the lingo to which the command belongs and a second byte identifying the particular command within the lingo. Other command structures can also be used. It is not required that all accessories, or all PMDs to which an accessory can be connected, support every lingo defined within the protocol.

In some embodiments, every accessory 220 and every PMD 202 that are designed to be interoperable with each other support at least a "general" lingo that includes commands common to all such devices. The general lingo can include commands enabling the PMD and the accessory to identify themselves to each other and to provide general information about their respective capabilities, including which (if any) other lingoes each supports. The general lingo can also include authentication commands that the PMD can use to verify the purported identity and capabilities of the accessory (or vice versa), and the accessory (or PMD) can be blocked from invoking certain commands or lingoes if the authentication is unsuccessful.

A command protocol supported by PMD 202 and accessory 220 can include a "remote control" or "remote user interface" lingo (or other group of commands) that can be used to communicate commands and data related to permitting a user to control the operation of PMD 202 by operating accessory 220. The remote user interface lingo can include commands that accessory 220 can send to PMD 202 to start and stop playback; to obtain information about a currently playing media asset (also referred to herein as a "track"); to interact with database engine 212 to navigate the database of media assets stored in PMD 202 and select a track or group of tracks to be played; and/or to control various settings (e.g., equalizer, audio book speed, etc.) of PMD 202.

Some embodiments of the present invention provide enhanced capability to control PMD 202 via a remote user interface lingo (or other group of commands).

Figure 3:
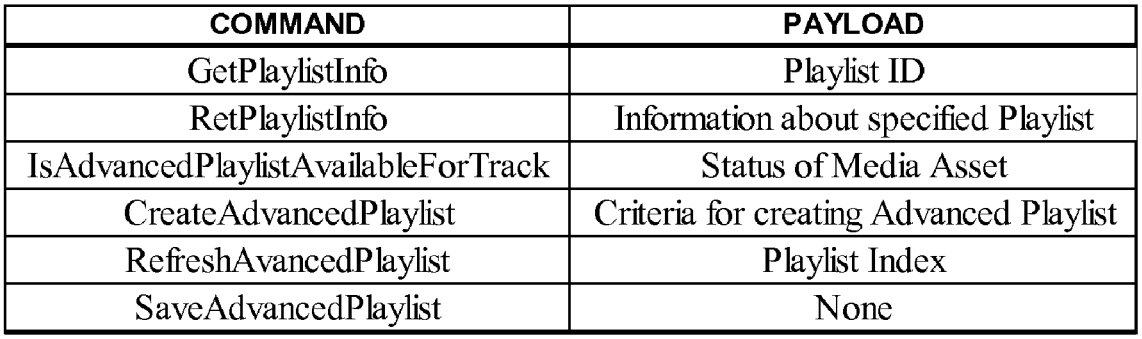
FIG. 3 is a table listing commands that can be used to exchange information between a portable media device and an accessory according to an embodiment of the present invention.

FIG. 3 shows table 300 listing commands that can be used by the accessory to communicate with the portable media device in order to perform various functions related to advanced playlists according to one embodiment of the present invention. These commands can be incorporated into a remote user interface lingo (or other group of commands), thereby allowing the user to control advanced playlist features of the portable media device by interacting with the accessory.

The GetPlaylistInfo command can be sent by the accessory to the portable media device to obtain information related to the playlists stored on the portable media device. The payload can include an identifier specifying a particular playlist for which the information is requested. For example, the types of information requested for a particular playlist can include playlist type (e.g., whether the playlist is an advanced playlist, a dynamically-created playlist, a standard playlist, etc), number of tracks in the playlist, playlist name and/or any other information about the playlist.

The PMD can respond with the RetPlaylistInfo command. The payload can include the requested information about the specified playlist. In one embodiment, the RetPlaylistInfo command can provide information about the type of the specified playlist.

The IsAdvancedPlaylistAvailableForTrack command can be sent by the accessory to the portable media device to determine whether a particular track (or asset) can be used as a seed track to create an advanced playlist. For example, in one embodiment, the accessory can request the portable media device to query its media asset database to determine if metadata used for advanced playlist creation is available for the media asset. If the metadata is available, the portable media device can conclude that the particular media asset has advanced playlist capability. This information can be communicated to the accessory. The payload of the IsAdvancedPlaylistAvailableForTrack command can include an identifier associated with a particular media asset to which the query is directed. This identifier can be provided in various ways. In one embodiment, playback engine 210 of PMD 202 (FIG. 2) maintains an indexed list of tracks currently queued for playback. Remote interface commands can be used by the accessory to determine how many tracks are queued. In one embodiment, each queued track is assigned a consecutive index value ranging from 0 to one less than the total number of tracks currently queued for playback, e.g., 0 to N−1 (where N is the total number of tracks currently queued for playback), and the accessory can inquire using this index value to determine whether a particular track has advanced playlist capability.

In some embodiments the PMD can respond to an IsAdvancedPlaylistAvailableforTrack command using an Acknowledgement (Ack) command. The payload of the Ack command can include a bitmask or other data indicating whether advanced playlist capability is available for a requested media asset. In some embodiments, the Ack command can also be used with an error code in the payload to indicate that the media asset identifier for the requested media asset is invalid. In other embodiments, after receiving the PMD's response via the Ack command, the accessory can provide an indication on its own user interface of whether a particular track can be used to create an advanced playlist.

The CreateAdvancedPlaylist command can be sent by the accessory to the portable media device. The payload can include information identifying the criteria to be used for grouping the media assets. The criteria can include a "seed" media asset described above, number of media assets to be included in the grouping, etc. In one embodiment, the CreateAdvancedPlaylist command can be sent when the user indicates, by operating the accessory's user interface, that he desires to have an advanced playlist created based on a particular track. The PMD can respond with an Ack command indicating whether an advanced playlist was successfully created. In some embodiments, the PMD can also respond with information indicating that an advanced playlist cannot be created for the track. It will be appreciated that mere presence of advanced playlist capability does not necessarily imply that the PMD can create an advanced playlist for a particular track. In some embodiments, successful creation of an advanced playlist can depend on several factors including availability of other tracks on the portable media device that correspond to the selection criteria derived from the seed media asset.

The SaveAdvancedPlaylist command can be sent by the accessory to the portable media device to instruct the PMD to save the current advanced playlist to its nonvolatile storage medium and to assign a playlist identifier to the advanced playlist. In addition, the current advanced playlist can be assigned a name and added to the list of playlists stored on the portable media device. In one embodiment, no payload is needed; in another embodiment, the payload can be an identifier of the advanced playlist that is to be saved.

The RefreshAdvancedPlaylist command can be sent by the accessory to the portable media device. The payload can be an identifier of an advanced playlist previously created, e.g., using the CreateAdvancedPlaylist command, and saved, e.g., using the SaveAdvancedPlaylist command. In some embodiments, the RefreshAdvancedPlaylist command can also be used to refresh an advanced playlist that has been created but not saved; the accessory can communicate a special playlist identifier value to the PMD to identify the unsaved advanced playlist. The execution of the RefreshAdvancedPlaylist command can result in the portable media device creating another advanced playlist that can include a different grouping and/or order of media assets from the previously created advanced playlist. The PMD can return an Ack command, as described above, to indicate the successful or unsuccessful execution of this command.

It will be appreciated that the commands described herein are illustrative and that variations and modifications are possible. In addition, other commands can also be provided. For example, some remote control and/or remote user interface protocols provide various GetTrackInfo commands usable by the accessory to query the PMD for information about tracks stored in the PMD's storage device. For each GetTrackInfo command, the PMD can return one or more corresponding RetTrackInfo commands whose payloads provide the requested information. In various implementations, GetTrackInfo commands can support queries based on an index of the track in a current playlist, an index of the track within some set of selected database records, (e.g., tracks by a currently selected artist or on a currently selected album), or the track's unique identifier within the PMD's database. A variety of information can be requested, such as track title, artist, album, and genre. In some embodiments, the payload of a GetTrackInfo command includes, in addition to an identifier of the track, a bitmask indicating which of a number of possible types of information are desired. In some embodiments, one bit within this bitmask can be associated with advanced playlist capability, and the accessory can inquire whether a particular track can be used as a seed for an advanced playlist by sending a GetTrackInfo command with the appropriate bit set.

As another example, some remote control and/or remote user interface protocols provide a GetNumberDBRecords command usable by the accessory to determine how many database records fit within a particular category; the PMD can select the specified category and return a RetNumberDBRecords command providing the number of records in the category. The desired category can be specified by a category code in a payload of the GetNumberDBRecords command. Thus, for example, the accessory can send a GetNumberDBRecords command with a payload corresponding to "artist" to find out how many artists are in the PMD's database. In one embodiment, one of the category codes defined for the GetNumberDBRecords command can correspond to advanced playlists, and the PMD can respond with a value indicating whether any advanced playlists are currently present on the PMD. In some embodiments, the value can indicate the number of such playlists that are present. Additional commands can be provided to allow the accessory to retrieve information about the name and/or contents of the advanced playlist.

In another embodiment, the PMD can be configured to automatically notify the accessory when a new track begins to play and to automatically provide information about the new track to the accessory. In one embodiment, the information provided can include an indicator as to whether the new track can be used for automatic playlist creation. Some embodiments provide a ConfigureNotifications command that the accessory can use, e.g., during startup, to register for the notifications it desires to receive, including notifications relating to change of track and capabilities of the new track.

Other commands and indicators can also be used to provide the accessory with information about advanced-playlist capabilities related to content stored on a PMD and/or the capabilities of the PMD itself. For example, in some embodiments, the accessory can inquire whether the PMD has been configured to support advanced playlist creation.

Figure 4:
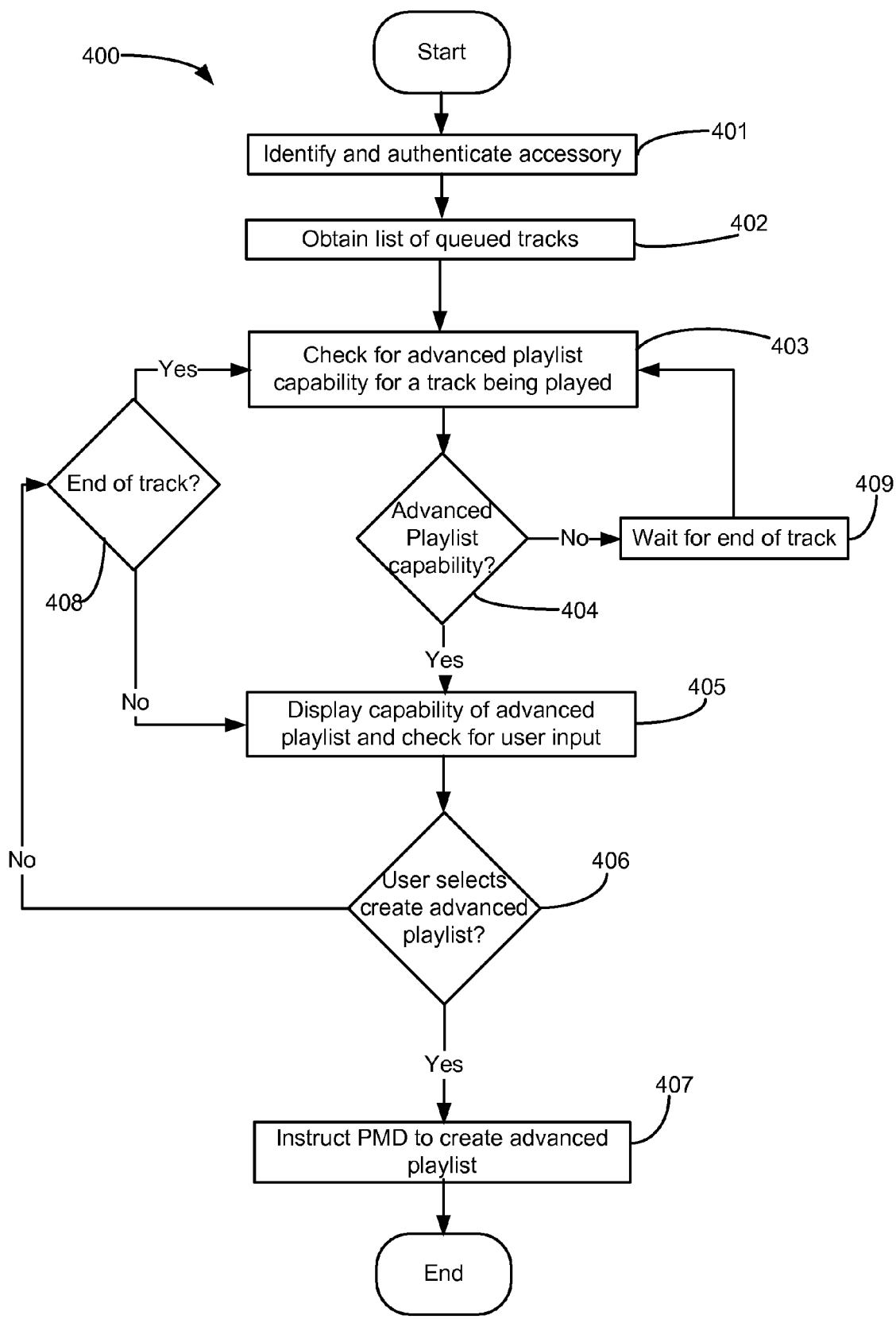
FIG. 4 is a flow diagram of a process that can be used by an accessory to communicate advanced playlist information to a portable media device according to an embodiment of the present invention.

FIG. 4 is a flow diagram of a process 400 for creating an advanced playlist according to one embodiment of the present invention. At block 401, the PMD can authenticate and identify the accessory, e.g., using one or more commands from the general lingo described above. Once the accessory is authenticated, it can exchange information with the PMD.

At block 402, the accessory can obtain a list of media assets in a playlist from the portable media device. The list can contain media assets that are currently queued to be played. The list can also contain information about other playlists stored on the portable media device.

At block 403, the accessory can query the PMD to ascertain whether the track being played has advanced playlist capability (e.g., whether the track can be used as a seed to generate an advanced playlist). For example, the accessory can use the IsAdvancedPlaylistAvailableForTrack command or another command that provides track information. In some embodiments, the accessory can register to be automatically notified of the track's capabilities, e.g., as described above, and a per-track query can be omitted.

At block 404, the accessory can receive information from the PMD indicating whether advanced playlist capability is available for the track being played. If the information from the PMD indicates that advanced playlist capability is not available for the track being played, the accessory can wait at block 409 for playback of the track to be completed. After playback is completed and a new track starts, the accessory can return to block 403 to check for advanced playlist capability of the new track. If at block 404 the information from the PMD indicates that advanced playlist capability is available for the track being played, the accessory can indicate advanced playlist capability for the track to a user of the accessory and check for user input at block 405. For example, accessory 110 of FIG. 1 can display track information 127 (obtained at block 402) for each track in a current playlist and an associated selectable button 129 for each track that has advanced playlist capability. In the example of FIG. 1, tracks 1, 3, and 4 have advanced playlist capability while track 2 does not have advanced playlist capability. The user input can be a selection indicating that the user wishes to create an advanced playlist for the particular track being played, e.g., pressing/selecting button 129 on the accessory display 125 or on remote user interface device 130.

If, at block 406 the user indicates that he wishes to create an advanced playlist, the accessory can instruct the PMD to create an advanced playlist at block 407. For example, the accessory can use the CreateAdvancedPlaylist command to instruct the PMD to create the advanced playlist. The PMD can respond indicating that an advanced playlist has been successfully created. In some embodiments, the PMD can respond with an error message indicating a failure to create an advanced playlist. A message indicating successful creation of an advanced playlist or an error message indicating failure to create an advanced playlist can be displayed, e.g., on accessory display 125 or remote user interface device display 135.

In some embodiments, the PMD may not create an advanced playlist even if the user selects to create an advanced playlist at block 406. For example, if the advanced playlist creation algorithm selects tracks based on similar metadata and too few tracks are present on the PMD, it might not be possible to create the playlist. In this instance, the instruction to the PMD at block 407 can result in an error message by the PMD indicating the PMD's inability to create an advanced playlist for the selected track. This error message can be communicated to the accessory for display to the user.

If at block 406 it is determined that the user has not provided any input, the accessory can wait for end of the track to be reached at block 408. If the end of the track has not been reached as determined at block 408, the accessory can continue to check for the user input at block 405. If at block 408, it is determined that end of track has been reached, the accessory can check for advanced playlist capability for the next track and processing is returned to block 403.

It will be appreciated that process 400 described herein is illustrative and that variations and modifications are possible. Acts described as sequential can be executed in parallel, order of acts can be varied, and acts can be modified or combined. For instance, at block 405 the user can have many options other than creating an advanced playlist or doing nothing. In various embodiments, the user may be able to pause, fast forward, rewind, execute database navigation, select a different track or playlist to play, etc. In any event, where the user activity results in a new track being played, relevant portions of process 400 can be used to determine whether the new track has advanced playlist capability and notify the user accordingly.

Figure 5:
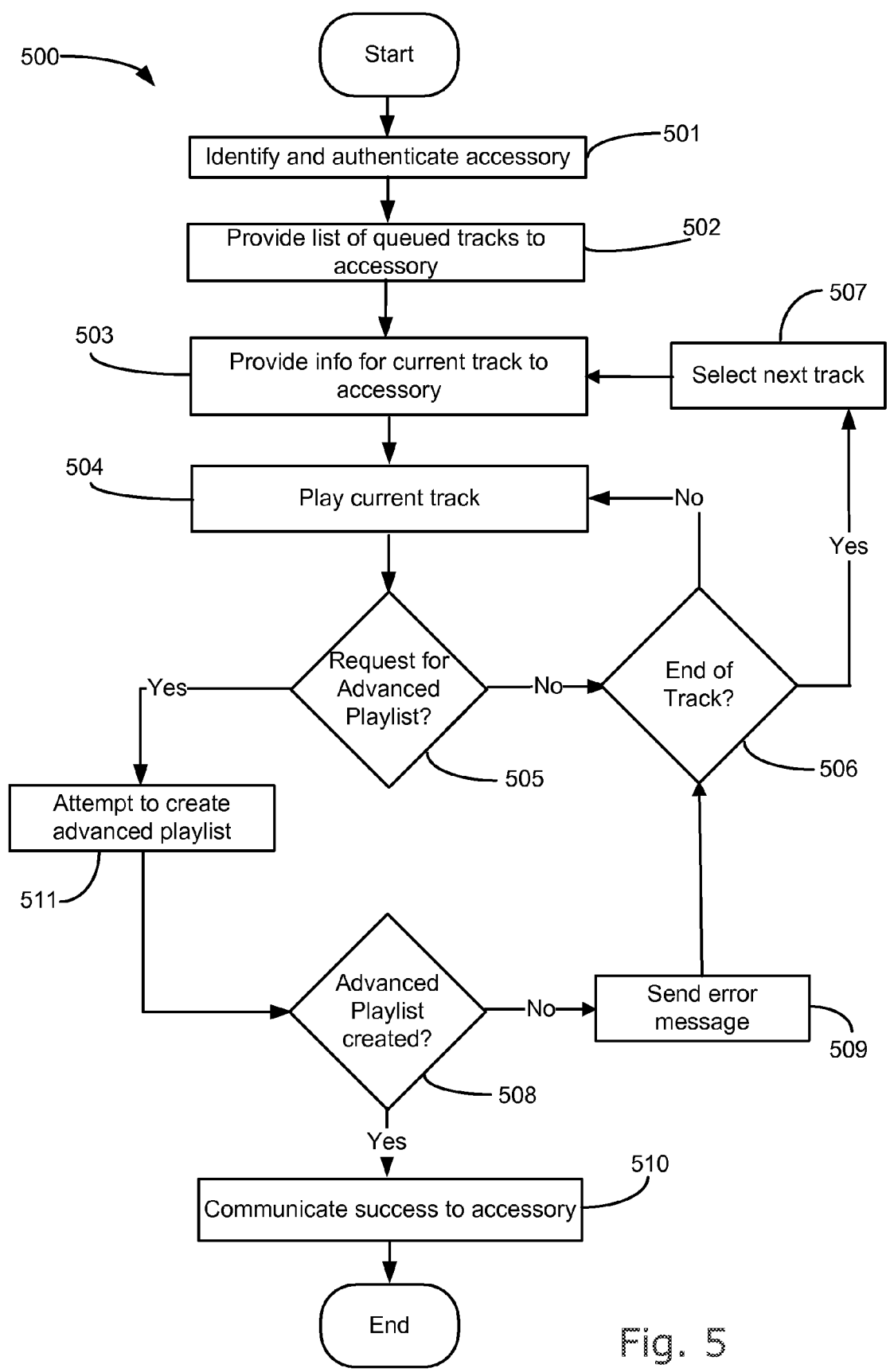
FIG. 5 is a flow diagram of a process that can be used by a portable media device to communicate advanced playlist information to an accessory according to an embodiment of the present invention.

FIG. 5 is a flow diagram of a process 500 for creating an advanced playlist according to another embodiment of the present invention. At block 501, the PMD can identify and authenticate the accessory, e.g., as described above in connection with process 400. At block 502, the PMD can provide the accessory with a list of media assets. The list can contain media assets that are currently queued to be played and/or other media assets stored on the PMD. In some embodiments, the PMD can provide the list in response to a request received from the accessory, e.g., using a command of the remote interface lingo.

At block 503, the PMD can communicate information about a current track to the accessory. The information provided by the PMD can include, e.g., track name, artist name, etc. In some embodiments, the PMD can be configured to automatically provide information about advanced playlist capability of the currently playing track. In other embodiments, the accessory can request the advanced playlist capability information from the PMD using a bit in, e.g., the GetTrackInfo command described above. In yet another embodiment, the accessory can use the IsAdvancedPlaylistAvailableForTrack command to request information about advanced playlist capability of the current track from the PMD.

At block 504, the PMD can commence playing of the current track. In some embodiments, the PMD can stream the audio and/or video information for the track to the accessory, e.g., using digital and/or analog signals. The accessory can then create an audio and/or video experience for the user based on the received information. In other embodiments, the PMD can play the track without sending any information to the accessory, e.g., using its own speaker(s), display screen, headphone jacks, etc.

At block 505, the PMD can receive a request from the accessory to create an advanced playlist for the current track. In one embodiment, the PMD can receive the CreateAdvancedPlaylist command from the accessory. If the PMD does not receive a request from the accessory to create an advanced playlist, the PMD can continue to play the current track and check for end of track at block 506. If it is determined, that end of track has been reached, the PMD can select the next track to be played, at block 507, and processing is returned to block 503.

If, at block 505, the PMD receives an instruction to create an advanced playlist for the current track, the PMD can attempt to create an advanced playlist for the current track, at block 511. For example, PMD can first determine if metadata used for advanced playlist creation exists for the track. If the metadata exists, the PMD can then attempt to create an advanced playlist, e.g., by identifying similar tracks. In some embodiments, an advanced playlist may not be created even if the portable media device indicates that a particular media track has advanced playlist capability; for example, even if the metadata used for advanced playlist creation exists for a given track, the PMD might not have enough other tracks that match selection criteria derived from that metadata. If the creation of an advanced playlist succeeds, (block 508), the PMD can communicate that to the accessory at block 510.

If on the other hand, the PMD determines that advanced playlist capability is not available for the current track, e.g., if metadata related to creation of an advanced playlist is not present, or that advanced playlist cannot be created for the current track, e.g., because too few tracks that qualify as similar to the selected track are present on the PMD (block 508), the PMD can generate an error message, at block 509, indicating unavailability of advanced playlist for the current track or inability to create an advanced playlist. In some embodiments, the error message generated at block 509 can be communicated to the accessory and displayed on the accessory display. In other embodiments, the error message may not be communicated to the accessory or the error message may not be generated at all by the PMD. After sending the error message, the PMD can continue playing the track until the end of track is reached (block 506).

It will be appreciated that process 500 described herein is illustrative and that variations and modifications are possible. Acts described as sequential can be executed in parallel, order of acts can be varied, and acts can be modified or combined. For instance, while playing a track at block 504, the PMD can receive requests from the accessory unrelated to creating an advanced playlist. In various embodiments, the user may be able to pause, fast forward, rewind, execute database navigation, select a different track or playlist to play, etc., by sending messages from the accessory to the PMD. In any event, where the user activity results in a new track being played, process 500 can proceed to step 503 to provide information for the new track. Further, in some embodiments, the PMD can receive requests to create an advanced playlist based on a track other than the currently playing track. For instance, the request can refer to a track in a currently selected list of media assets from the database.

While the invention has been described with respect to specific embodiments, those skilled in the art will recognize that numerous modifications are possible. For instance, the user input can be received by the accessory via a remote user interface device that can be communicably coupled to the accessory. The particular commands and sequences of events described herein are illustrative and other combinations of commands and sequences of events can be used. In some embodiments, an accessory can determine the availability of advanced-playlist capability for a particular track other than the currently playing track. For example if the user is browsing the database of media assets stored on a PMD using an accessory's user interface, the accessory can provide an indication of advanced playlist availability for each track on any currently displayed list of tracks. In some embodiments, the user can interact with the accessory to generate an advanced playlist based on any track stored on the PMD, regardless of whether that track (or indeed any track) is currently playing.

In addition, embodiments of the present invention can be realized using any combination of dedicated components and/or programmable processors and/or other programmable devices. While the embodiments described above can make reference to specific hardware and software components, those skilled in the art will appreciate that different combinations of hardware and/or software components can also be used and that particular operations described as being implemented in hardware might also be implemented in software or vice versa.

Computer programs incorporating various features of the present invention can be encoded on various computer readable media for storage and/or transmission; suitable media include magnetic disk or tape, optical storage media such as compact disk (CD) or DVD (digital versatile disk), flash memory, and the like. Computer readable media encoded with the program code can be packaged with a compatible device or provided separately from other devices (e.g., via Internet download).

Thus, although the invention has been described with respect to specific embodiments, it will be appreciated that the invention is intended to cover all modifications and equivalents within the scope of the following claims.

What is claimed is:

1. An accessory for use with a portable media device, the accessory comprising:
    a user interface;
    a media device interface configured to communicate with the portable media device using a set of commands; and
    a controller coupled between the user interface and the media device interface and configured to generate commands to be communicated to the portable media device in response to user input received by the user interface,
    wherein the set of commands includes:
        a first command sendable by the accessory, the first command requesting advanced playlist capability information about a media track located on the portable media device;
        a second command receivable by the accessory, the second command including information about the advanced playlist capability of the media track; and
        a third command sendable by the accessory, the third command including instructions to create an advanced playlist based at least in part on the media track;
    wherein the advanced playlist capability information is indicative of whether the media track can be used as a seed track.

2. The accessory of claim 1 wherein the set of commands further includes:
    a fourth command receivable by the accessory, the fourth command including notification about successful creation of the advanced playlist.

3. The accessory of claim 1 wherein the set of commands further includes:
    a fourth command sendable by the accessory, the fourth command instructing the portable media device to generate a different advanced playlist based on the media track.

4. The accessory of claim 1 wherein the set of commands further includes:
    a fourth command sendable by the accessory, the fourth command instructing the portable media device to save the advanced playlist.

5. The accessory of claim 1 wherein the media device interface is configured to communicate the set of commands over a wireless medium.

6. The accessory of claim 1 wherein the user interface includes a remote control device.

7. The accessory of claim 1 wherein the user interface includes a user operable input control operable to instruct the controller to generate the third command for a user-selected media track.

8. A method for use in an accessory communicably coupled to a portable media device, the method comprising:
    sending a first command to the portable media device, the first command requesting advanced playlist capability information about a media track;
    receiving a second command from the portable media device, the second command including advanced playlist capability information about the media track;
    displaying track information for the user, the information including an indication as to whether the media track has advanced playlist capability;
    detecting user input indicating that a advanced playlist should be created using the media track; and
    in response to the user input, sending a third command to the portable media device, the third command including instructions to create a advanced playlist based at least in part on the media track;
    wherein the advanced playlist capability information is indicative of whether the media track can be used as a seed track.

9. The method of claim 8 further comprising:
    sending a fourth command to the portable media device, the fourth command instructing the portable media device to save the advanced playlist.

10. The method of claim 8 further comprising:
    sending a fourth command to the portable media device, the fourth command instructing the portable media device to generate a different advanced playlist based at least in part on the media track.

11. A non-transitory computer-readable medium containing program instructions that, when executed by a controller within an accessory, cause the controller to execute a method of communicating advanced playlist information to a portable media device, the method comprising:
    sending a first command to the portable media device, the first command requesting advanced playlist capability information about a media track;
    receiving a second command from the portable media device, the second command including advanced playlist capability information about the media track; and
    sending a third command to the portable media device, the third command including instructions to create a first advanced playlist based at least in part on the media track;
    wherein the advanced playlist capability information is indicative of whether the media track can be used as a seed track.

12. The non-transitory computer-readable medium of claim 11 wherein the method further comprises:
    sending a fourth command to the portable media device, the fourth command instructing the portable media device to generate a second advanced playlist based on the media track.

13. The non-transitory computer-readable medium of claim 12 wherein the first advanced playlist is different from the second advanced playlist.

14. The non-transitory computer-readable medium of claim 12 wherein the second advanced playlist replaces the first advanced playlist.

15. The non-transitory computer-readable medium of claim 11 wherein the method further comprises:
   sending a fourth command to the portable media device, the fourth command instructing the portable media device to save the first advanced playlist.

16. A portable media device for use with an accessory, the portable media device comprising:
   an accessory interface configured to communicate with the accessory using a set of commands,
   wherein the set of commands includes:
      a first command receivable from the accessory, the first command requesting advanced playlist capability information about a media track located on the portable media device;
      a second command sendable to the accessory, the second command including the advanced playlist capability information of the media track; and
      a third command receivable from the accessory, the third command instructing the portable media device to create a advanced playlist based at least in part on the media track
      wherein the advanced playlist capability information is indicative of whether the media track can be used as a seed track.

17. The portable media device of claim 16 wherein the set of commands further includes:
   a fourth command receivable from the accessory, the fourth command instructing the portable media device to save the advanced playlist.

18. The portable media device of claim 16 wherein the set of commands further includes:
   a fourth command receivable from the accessory, the fourth command instructing the portable media device to create a different advanced playlist based on the media track.

19. The portable media device of claim 16 wherein the set of commands further includes:
   a fourth command sendable to the accessory, the fourth command indicating whether the advanced playlist was successfully created.

20. A method for use in a portable media device communicably coupled to an accessory, the method comprising:
   receiving a first command from the accessory, the first command requesting advanced playlist capability information about a media track located on the portable media device;
   sending a second command to the accessory, the second command including the advanced playlist capability information of the media track;
   receiving a third command from the accessory, the third command instructing the portable media device to create a advanced playlist based at least in part on the media track; and
   sending a fourth command to the accessory, the fourth command indicating a status of the advanced playlist;
   wherein the advanced playlist capability information is indicative of whether the media track can be used as a seed track.

21. The method of claim 20 further comprising:
   communicating the advanced playlist to the accessory to be displayed on an accessory display.

22. The method of claim 20 further comprising:
   receiving a fifth command from the accessory, the fifth command instructing the portable media device to create another advanced playlist based at least in part on the media track.

23. The method of claim 20 further comprising:
   receiving a fifth command from the accessory, the fifth command instructing the portable media device to save the advanced playlist.

* * * * *